Patented Dec. 24, 1940

2,226,199

UNITED STATES PATENT OFFICE 2,226,199

AZO COMPOUNDS AND MATERIAL COLORED THEREWITH

Joseph B. Dickey, Rochester, N. Y., assignor to Eastman Kodak Company, Rochester, N. Y., a corporation of New Jersey No Drawing. Application February 23, 1939, Serial No. 258,021

15 Claims. (Cl. 260—205)

This invention relates to the art of dyeing or coloring. More particularly, it relates to new azo dye compounds and the application of the nuclear non-sulfonated dye compounds for the coloration of organic derivatives of cellulose, particularly textile materials made of or containing an organic derivative of cellulose, by dyeing, printing, stenciling, or like methods.

Organic derivatives of cellulose are characterized by an indifferent affinity for the usual cotton and wool dyes especially the ordinary water soluble dyes. Because of this, it has been necessary to develop new dye compounds suitable for the dyeing or coloration of materials, such as textile materials, made of or containing an organic derivative of cellulose. It is, accordingly, an object of my invention to provide a new class of azo dyes suitable for the dyeing or coloration of organic derivatives of cellulose. Another object is to provide a process for the coloration of organic derivatives of cellulose in which the dye or dyes are applied directly from an aqueous suspension to the material undergoing coloration. A further object is to produce dyeings on organic derivatives of cellulose which are of good fastness to light and washing. Other objects will hereinafter appear.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While my invention will be illustrated more particularly in connection with the coloration of cellulose acetate, a material to which the invention is especially adapted, it will be understood that it applies to the coloration of other organic derivatives of cellulose such as those just mentioned.

The azo dye compounds of my invention have the general formula:

$$R-N=N-R_1$$

wherein R represents the residue of an aryl nucleus of the benzene series containing two

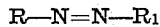

groups, wherein $R_2$ represents an alkyl group, an allyl group, or a cycloalkyl group, one in ortho and one in para position to the azo bond and $R_1$ represents the residue of an aromatic, a hydroaromatic, or a heterocyclic coupling component.

While my invention relates broadly to azo dye compounds having the above general formula, it relates more particularly to the azo compounds having the general formulae:

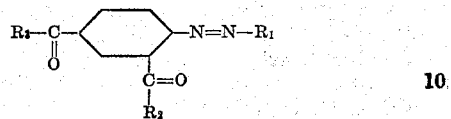

and

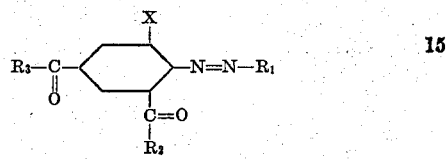

wherein $R_2$ and $R_3$ each represents an alkyl group, an allyl group, or a cycloalkyl group, $R_1$ represents an aromatic nucleus, a hydroaromatic nucleus, or a heterocyclic nucleus and X represents a monovalent substituent such as, for example, a nitro group, a halogen atom, an alkyl group, an alkoxy group, an aryloxy group, a sulfonamide group, a carboxamide group, or an alkyl sulfone group. Advantageously $R_2$ and $R_3$ are alkyl. Similarly, $R_1$ is advantageously the residue of an aryl coupling component of the benzene series and more particularly the residue of a hydroxyalkylamine of the benzene series.

The azo dye compounds of my invention can be prepared by diazotizing a primary aromatic amine having the general formula $RNH_2$ wherein R represents the residue of an aryl nucleus of the benzene series containing two

groups, wherein $R_2$ represents an alkyl group, an allyl group, or a cycloalkyl group, one in ortho and one in para position to the amino group and coupling the diazonium compound obtained with an aromatic, a hydroaromatic or a teterocyclic coupling compound.

As previously indicated the nuclear non-sulfonated dye compounds of my invention constitute valuable dyes for the coloration of organic derivatives of cellulose such as those hereinbefore mentioned yielding various shades thereon of good fastness to light and washing. These nuclear non-sulfonated dye compounds likewise possess application for the dyeing of wool and silk and yield generally similar shades on these materials as on organic derivatives of cellulose. Nuclear sulfonated compounds having the general formula of the compounds of my invention can likewise be prepared in known fashion. These compounds possess little or no utility for the coloration of organic derivatives of cellulose but can be employed to color textile materials such as wool and silk yielding various shades thereon.

The following examples illustrate the preparation of the azo dye compounds of my invention:

Example 1

17.7 grams of 1-amino-2,4-phenyldimethylketone are added to 200 cc. of water to which has been added 30 cc. of 36% hydrochloric acid. The resulting solution is cooled by the addition of ice, for example, to about 0–50° C. and the amine is diazotized by the addition, with stirring, of 6.9 parts of sodium nitrite dissolved in water while maintaining the temperature at about 0–5° C.

14.4 grams of 5,5-dimethyl-1,3-cyclohexadione are dissolved in an excess of a 2N sodium hydroxide solution, the resulting solution is cooled to a temperature approximating 0–10° C. and the diazo solution prepared as described above is slowly added with stirring. Upon completion of the coupling reaction which takes place, the mixture is made acid to litmus by the addition of hydrochloric acid and the dye compound formed is recovered by filtration, washed with water and dried. The dye compound obtained colors cellulose acetate silk a greenish-yellow shade.

Example 2

14.2 grams of 1-methyl barbituric acid,

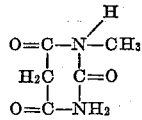

are dissolved in 200 cc. of water containing 30 grams of sodium carbonate. The resulting solution is cooled to a temperature approximating 0–10° C. and the diazonium solution prepared as described in Example 1 is added with stirring. Upon completion of the coupling reaction which takes place, the mixture is made acid to litmus by the addition of hydrochloric acid and the dye compound formed is recovered by filtration, washed with water and dried. The dye compound obtained colors cellulose acetate silk a greenish-yellow shade.

Example 3

19.1 grams of 1-amino-2-methyl-4-ethylphenyl diketone

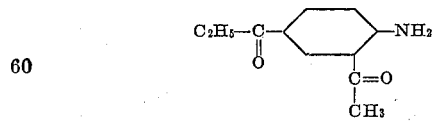

are diazotized as described in Example 1.

13.7 grams of cresidine are dissolved in a cold dilute hydrochloric acid solution and the resulting solution is cooled, if necessary, to a temperature of 0–10° C. The diazonium solution prepared as described above is added, with stirring, to this cooled solution and after its addition the mixture is permitted to stand a short time following which it is slowly made neutral to Congo red paper by the addition of sodium acetate. Upon completion of the coupling reaction, the dye compound formed is recovered by filtration, washed with water and dried. The dye compound obtained colors cellulose acetate silk a red shade.

Example 4

20.5 grams of 1-amino-2-propyl-4-methylphenyl diketone are diazotized in accordance with the method described in Example 1 and the diazonium compound obtained is coupled with 18.1 grams of di-β-hydroxyethyl aniline. The coupling reaction may be carried out as described in Example 3. The dye compound obtained colors cellulose acetate silk a red shade.

Example 5

21.9 grams of 1-amino-2-methyl-4-butylphenyl diketone are diazotized in accordance with the method described in Example 1 and the diazonium compound obtained is coupled with 13.5 grams of monoethyl-m-toluidine. The coupling reaction may be carried out as described in Example 3. The dye compound obtained colors cellulose acetate silk a rubine shade.

Example 6

23.3 grams of 1-amino-2-pentyl-4-methylphenyl diketone are diazotized in accordance with the method described in Example 1 and the diazonium compound obtained is coupled with 16.7 grams of β-hydroxyethyl-m-toluidine. Coupling may be carried out as described in Example 1. The dye compound obtained colors cellulose acetate silk a rubine shade.

Example 7

20.7 grams of,

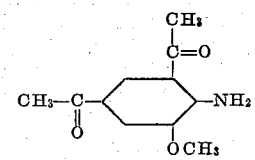

are diazotized in accordance with the method described in Example 1 and the diazonium compound obtained is coupled with 14.4 grams of 5,5-dimethyl-1,3-cyclohexadione. The coupling reaction may also be carried out as described in Example 1. The dye compound obtained colors cellulose acetate silk a greenish-yellow shade.

Example 8

20.5 grams of,

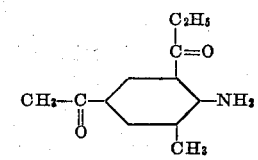

are diazotized in accordance with the method described in Example 1 and the diazonium compound obtained is coupled with 14.2 grams of 1-methyl barbituric acid. The coupling reaction may be carried out as described in Example 2. The dye compound obtained colors cellulose acetate silk a greenish-yellow shade.

Example 9

28 grams of 1-amino-2-methyl-4-cyclohexyl-6-carboxamidephenyl diketone are diazotized in accordance with the method described in Example 1 and the diazonium compound obtained is coupled with 16.7 grams of β-hydroxyethyl-m-toluidine. The coupling reaction may be carried out as described in Example 3. The dye compound obtained colors cellulose acetate a red shade.

Example 10

1 gram mole of 1-amino-2,4-dimethyl-6-nitrophenyl diketone is diazotized and the diazonium compound obtained is coupled with 1 gram mole of 5-hydroxy dimethyl-α-naphthylamine. The coupling reaction may be carried out in accordance with the method described in Example 3. The dye compound obtained colors cellulose acetate silk a blue shade.

Example 11

1 gram mole of

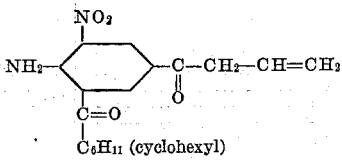

is diazotized in accordance with the method described in Example 1 and the diazonium compound obtained is coupled with 1 gram mole of the sodium salt of sulfatoethylbutylaniline. The dye compound formed by the coupling reaction may be precipitated from solution by the addition of sodium chloride following which it may be recovered by filtration and then dried. The dye compound obtained colors cellulose acetate silk a rubine shade.

Example 12

1 gram mole of

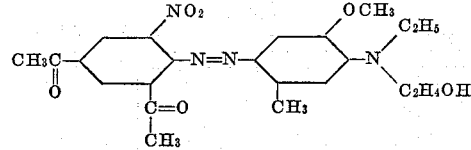

is dissolved in a mixture of dioxane and pyridine and phenylphosphoryloxychloride (20% excess) is added dropwise with stirring at 10° C. Following this addition, the mixture is then slowly warmed to 60° C. over a period of four hours. Upon completion of the reaction, an aqueous solution of sodium carbonate is added until the mixture is just alkaline to litmus. Following the addition of the sodium carbonate, the dioxane and pyridine solvents are removed by distillation under reduced pressure and the residue remaining containing the desired dye compound is dissolved in hot water and filtered to remove impurities. The desired dye compound may be precipitated from the filtrate by the addition of sodium chloride following which it may be recovered by filtration and dried. The dye compound obtained is water-soluble and colors cellulose acetate silk a purple shade from an aqueous solution.

1 gram mole of 2,4-dimethylphenyl diketone azoethyl-β-hydroxyethylaniline may be substituted for the dye compound of the above example to obtain a dye which has the formula:

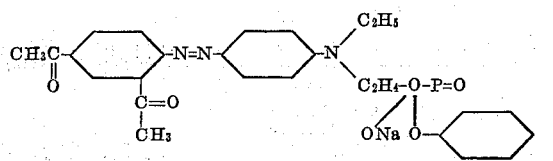

which colors cellulose acetate silk a red shade from its aqueous solution.

Example 13

24.6 grams of

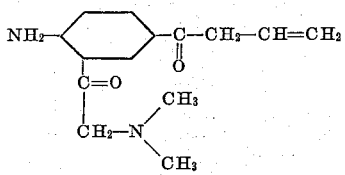

are diazotized in accordance with the method described in Example 1 and the diazonium compound obtained is coupled with 22.4 grams of sodium-1-hydroxynaphthalene-5-sulfonate dissolved in a cold aqueous solution of sodium carbonate. Upon completion of the coupling reaction the mixture is made acid to Congo red paper and the dye compound formed, precipitated by the addition of sodium chloride, recovered by filtration, washed and dried. This dye compound has little or no affinity for organic derivatives of cellulose but colors wool and silk a red shade.

The following tabulation further illustrates the compounds included within the scope of my invention together with the color they produce on cellulose acetate silk. The compounds indicated below may be prepared by diazotizing the amines listed under the heading "Amine" and coupling the diazonium compounds obtained thereby with the compounds specified in the column entitled "Coupling component". The diazotization and coupling reactions may, for example, be carried out following the general procedure described in Examples 1 to 13, inclusive.

| Amine | Coupling component | Color on cellulose acetate silk |
|---|---|---|
| CH₃—CH₂—CH₂—CO—C₆H₂(Cl)(COCH₃)—NH₂ | 1-amino-2-methoxy-5-methylbenzene<br>Di-β-hydroxyethyl-aniline | Wine.<br>Rubine. |
| HOCH₂—CO—C₆H₂(Br)(COCH₂CH₂CH₂CH₃)—NH₂ | Di-β-hydroxyethyl aniline<br>Ethyl glyceryl-aniline | Do.<br>Do. |
| CH₃—CO—C₆H₂(SO₂NH₂)(COCH₃)—NH₂ | Mono ethyl-m-toluidine | Wine. |

| Amine | Coupling component | Color on cellulose acetate silk |
|---|---|---|
| 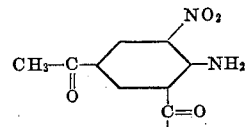 | 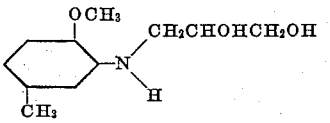 | Violet. |
| Do | Phenylmorpholene | Rubine. |
| Do | 5-hydroxy dimethyl-α-naphthylamine | Blue. |
| 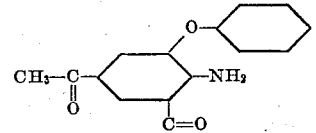 | 5,5-dimethyl-1,3-cyclo-hexadione<br>Barbituric acid<br>Ethyl-β-hydroxyethylaniline<br>Di-β-hydroxyethylaniline | Greenish-yellow.<br>Do.<br>Red.<br>Do. |
| 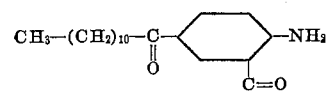 | Monoglyceryl cresidine | Rubine. |
| 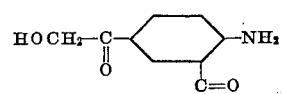 | Dimethyl-α-naphthylamine | Do. |
| 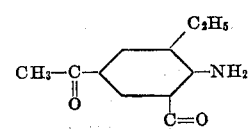 | 3-methyl-5-pyrazolone<br>6-methylpyronone<br>Ethyl-m-toluidine | Greenish-yellow.<br>Do.<br>Rubine. |
| 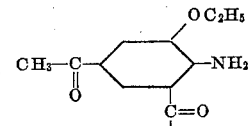 | Mono-β-hydroxyethylaniline<br>Methyl ethylaniline | Red.<br>Do. |
| 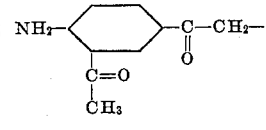 | Monocyclohexylaniline<br>Phenylmorpholene<br>Ethyl glyceryl-2,5-dimethoxyaniline | Do.<br>Do.<br>Rubine. |
| 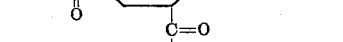 | Propyl glycerylaniline | Red. |
| Do<br>Do<br>Do<br>Do<br>Do<br>Do<br>Do<br>Do<br>Do<br>Do<br>Do | Ethyl-glyceryl-m-chloroaniline<br>Di-β-hydroxyethyl-α-naphthylamine<br>3-hydroxy tetrahydroquinoline<br>Tetrahydro naphthoquinoline<br>Sodium ethyl-β-sulfatoethylaniline<br>Sodium butyl-β-sulfoethylaniline<br>Phenyl morpholene<br>1-amino-2-methyl-5-methoxybenzene<br>Ethyl-β-hydroxyethylaniline<br>Di-β-hydroxyethyl-m-bromoaniline<br>Dimethylaniline | Do.<br>Wine.<br>Do.<br>Violet.<br>Red.<br>Do.<br>Do.<br>Do.<br>Do.<br>Do.<br>Do. |

It will be understood that the dyes of Examples 1–12, inclusive, and of the tabulation color organic derivatives of cellulose, other than cellulose acetate silk, generally similar shades as indicated for cellulose acetate silk. Again, as previously indicated, these dyes color wool and silk generally similar shades as organic derivatives of cellulose.

The specific dye compounds shown or indicated herein are intended to be illustrative and not limitative of my invention. To illustrate, any of the diazo components disclosed herein may be coupled with any of the coupling components shown herein to obtain dyes within the scope of my invention. Similarly, diazotized 1-amino-2,4-dimethyl-6-sulfonic phenyl diketone, for example, can be coupled with the various coupling components disclosed herein to obtain dyes suited for the coloration of wool and silk.

In order that my invention may be fully understood, the preparation of a number of intermediate substances employed in the manufacture of the dye compounds of my invention is disclosed hereinafter.

Compounds having the general formula:

$$R_3-\underset{\underset{O}{\|}}{C}-\underset{\underset{\underset{R_3}{|}}{\underset{C=O}{}}}{\langle\phantom{xx}\rangle}-OH$$

wherein $R_3$ has the meaning previously assigned to it may be prepared in accordance with the general method described in J. prakt. chem. 2, vol. 130, at page 81—(1931). Compounds of the above general formula may be converted to aminoketones having the general formula:

$$R_3-\underset{\underset{O}{\|}}{C}-\underset{\underset{\underset{R_3}{|}}{\underset{C=O}{}}}{\langle\phantom{xx}\rangle}-NH_2$$

by heating with an excess of ammonia water in an autoclave, with or without a catalyst such as finely divided nickel, at temperatures ranging between 150–300° C. These aminoketones, which can be diazotized and employed in the production of the azo compounds of my invention, can in turn be halogenated, nitrated or sulfonated, for example, in accordance with the methods described in J. Chem. Soc. 85, 340 (1904); 105, 125 (1914), p. 2403 (1931), J. Am. Chem. Soc. 50, 158 (1928), Ber. 65, 1334 (1932) and Org. Syn, Coll. Vol. 1, p. 78.

The azo dye compounds of my invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of my invention which are water soluble do not, of course, require the use of a dispersing or solubilizing agent but may be applied to silk, wool and (depending upon the nature and position of the water-solubilizing group) organic derivatives of cellulose textile materials from an aqueous solution of the dye which may contain salt. For a more complete description as to how the azo dye compounds of my invention may be employed in dyeing or coloring operations, reference may be had to McNally and Dickey U. S. Letters Patent No. 2,115,030, issued April 26, 1938. For a more detailed description as to how the water soluble azo dyes of my invention may be employed for the coloration of textile materials made of or containing organic derivatives of cellulose, silk and wool or mixtures of these, reference may be had to McNally and Dickey U. S. Letters Patent No. 2,107,898, issued February 8, 1938.

I claim:
1. The azo dye compounds having the general formula:

$$R-N=N-R_1$$

wherein R represents the residue of an aryl nucleus of the benzene series containing two $$R_2-\underset{\underset{O}{\|}}{C}-$$

groups, wherein $R_2$ represents an alkyl group, an allyl group or a cycloalkyl group, one in ortho and one in para position to the azo bond and $R_1$ represents the residue of a coupling component selected from the group consisting of a benzene, a naphthalene, a hydroaromatic, and a heterocyclic coupling component.

2. The azo dye compounds having the general formula:

$$R-N=N-R_1$$

wherein R represents the residue of an aryl nucleus of the benzene series containing two $$R_2-\underset{\underset{O}{\|}}{C}-$$

groups, wherein $R_2$ represents an alkyl group, an allyl group or a cycloalkyl group, one in ortho and one in para position to the azo bond and $R_1$ represents the residue of a hydroxyalkylamine of the benzene series.

3. The azo dye compounds having the general formula:

$$R-N=N-R_1$$

wherein R represents the residue of an aryl nucleus of the benzene series containing two $$R_2-\underset{\underset{O}{\|}}{C}-$$

groups, wherein $R_2$ represents an alkyl group, one in ortho and one in para position to the azo bond and $R_1$ represents the residue of a coupling component selected from the group consisting of a benzene, a naphthalene, a hydroaromatic, and a heterocyclic coupling component.

4. The azo dye compounds having the general formula:

$$R-N=N-R_1$$

wherein R represents the residue of an aryl nucleus of the benzene series containing two $$R_2-\underset{\underset{O}{\|}}{C}-$$

groups, wherein $R_2$ represents an alkyl group, one in ortho and one in para position to the azo bond and $R_1$ represents the residue of a benzene coupling component.

5. The nuclear non-sulfonated azo dye compounds having the general formula:

$$R-N=N-R_1$$

wherein R represents the residue of an aryl nucleus of the benzene series containing two $$R_2-\underset{\underset{O}{\|}}{C}-$$

groups, wherein $R_2$ represents an alkyl group, one in ortho and one in para position to the azo bond and $R_1$ represents the residue of a hydroxyalkylamine of the benzene series.

6. The azo dye compounds having the general formula:

$$R_3-\underset{\underset{O}{\|}}{C}-\underset{\underset{\underset{R_3}{|}}{\underset{C=O}{}}}{\langle\phantom{xx}\rangle}-N=N-R_1$$

wherein $R_2$ and $R_3$ each represents a member selected from the group consisting of an alkyl group, an allyl group and a cycloalkyl group and $R_1$ represents the residue of a member selected from the group consisting of a benzene nucleus, a naphthalene nucleus, a hydroaromatic nucleus and a heterocyclic nucleus.

7. The azo dye compounds having the general formula:

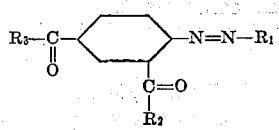

wherein $R_2$ and $R_3$ each represents an alkyl group and $R_1$ represents the residue of a benzene coupling component.

8. The nuclear non-sulfonated azo dye compounds having the general formula:

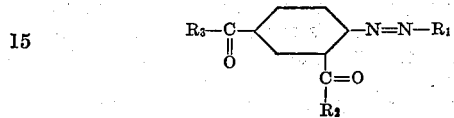

wherein $R_2$ and $R_3$ each represents an alkyl group and $R_1$ represents the residue of a hydroxyalkylamine of the benzene series.

9. The azo dye compounds having the general formula:

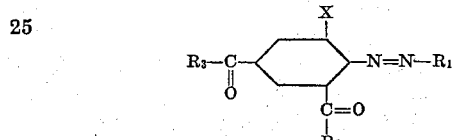

wherein $R_2$ and $R_3$ each represents a member selected from the group consisting of an alkyl group, an allyl group and a cycloalkyl group, $R_1$ represents the residue of a coupling component selected from the group consisting of a benzene, a naphthalene, a hydroaromatic, and a heterocyclic coupling component and wherein X represents a member selected from the group consisting of a nitro group, a halogen atom, an alkoxy group, an alkyl group, an aryloxy group, a sulfonamide, a carboxamide, and an alkyl sulfone group.

10. The azo dye compounds having the general formula:

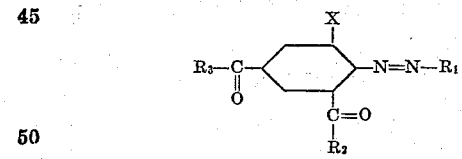

wherein $R_2$ and $R_3$ each represents an alkyl group, $R_1$ represents the residue of a benzene coupling component and wherein X represents a member selected from the group consisting of a nitro group, a halogen atom, an alkoxy group, an alkyl group, an aryloxy group, a sulfonamide, a carboximide, and an alkyl sulfone group.

11. The nuclear non-sulfonated azo dye compounds having the general formula:

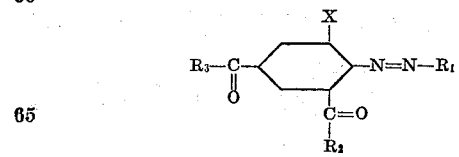

wherein $R_2$ and $R_3$ each represents an alkyl group, $R_1$ represents the residue of a hydroxyalkylamine of the benzene series and wherein X represents a member selected from the group consisting of a nitro group, a halogen atom, an alkoxy group, an alkyl group, an aryloxy group, a sulfonamide, a carboxamide, and an alkyl sulfone group.

12. Material made of or containing an organic derivative of cellulose colored with a nuclear non-sulfonated azo dye compound having the general formula:

$$R-N=N-R_1$$

wherein R represents the residue of an aryl nucleus of the benzene series containing two

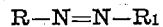

groups, wherein $R_2$ represents an alkyl group, an allyl group or a cycloalkyl group, one in ortho and one in para position to the azo bond and $R_1$ represents the residue of a coupling component selected from the group consisting of a benzene, a naphthalene, a hydroaromatic, and a heterocyclic coupling component.

13. Material made of or containing an organic derivative of cellulose colored with a nuclear non-sulfonated azo dye compound having the general formula:

$$R-N=N-R_1$$

wherein R represents the residue of an aryl nucleus of the benzene series containing two

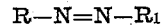

groups, wherein $R_2$ represents an alkyl group, one in ortho and one in para position to the azo bond and $R_1$ represents the residue of a hydroxalkylamine of the benzene series.

14. A cellulose acetate colored with a nuclear non-sulfonated azo dye compound having the general formula:

$$R-N=N-R_1$$

wherein R represents the residue of an aryl nucleus of the benzene series containing two

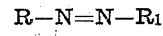

groups, wherein $R_2$ represents an alkyl group, an allyl group or a cycloalkyl group, one in ortho and one in para position to the azo bond and $R_1$ represents the residue of a coupling component selected from the group consisting of a benzene, a naphthalene, a hydroaromatic, and a heterocyclic coupling component.

15. A cellulose acetate colored with a nuclear nonsulfonated azo dye compound having the general formula:

$$R-N=N-R_1$$

wherein R represents the residue of an aryl nucleus of the benzene series containing two

groups, wherein $R_2$ represents an alkyl group, one in ortho and one in para position to the azo bond and $R_1$ represents the residue of a hydroxyalkylamine of the benzene series.

JOSEPH B. DICKEY.

CERTIFICATE OF CORRECTION.

Patent No. 2,226,19_. December 24, 1940.

JOSEPH B. LICKEY.

It is hereby certified that error appears in the printed specification of the above numbered patent requiring correction as follows: Page 1, second column, line 5, after "azo" insert --dye--; line 45, for "teterocyclic" read --heterocyclic--; page 2, first column, line 17, for "0-50° C." read --0-5° C.--; and that the said Letters Patent should be read with this correction therein that the same may conform to the record of the case in the Patent Office.

Signed and sealed this 29th day of April, A. D. 1941.

Henry Van Arsdale,
Acting Commissioner of Patents.

(Seal)